(12) United States Patent
Yeh et al.

(10) Patent No.: US 11,127,996 B2
(45) Date of Patent: Sep. 21, 2021

(54) FIREPROOF BATTERY MODULE AND FIREPROOF LAYER

(71) Applicant: INDUSTRIAL TECHNOLOGY RESEARCH INSTITUTE, Hsinchu (TW)

(72) Inventors: Sheng-Fa Yeh, Miaoli (TW); Deng-Tswen Shieh, Hsinchu (TW); Chein-Chung Sun, Kaohsiung (TW); Tsung Hsiung Wang, Taichung (TW); Shiow Huey Jang Suen, Hsinchu County (TW); Shih-Ming Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 103 days.

(21) Appl. No.: 16/357,786

(22) Filed: Mar. 19, 2019

(65) Prior Publication Data
US 2020/0220238 A1    Jul. 9, 2020

(30) Foreign Application Priority Data

Jan. 4, 2019 (TW) ................................. 108100329

(51) Int. Cl.
*H01M 10/659*     (2014.01)
*H01M 10/643*     (2014.01)
(Continued)

(52) U.S. Cl.
CPC ....... *H01M 10/659* (2015.04); *H01M 10/643* (2015.04); *H01M 10/658* (2015.04);
(Continued)

(58) Field of Classification Search
CPC ............. H01M 10/659; H01M 10/658; H01M 10/643; H01M 10/647; H01M 10/6554; H01M 2200/10
See application file for complete search history.

(56) References Cited

U.S. PATENT DOCUMENTS 5,516,600 A * 5/1996 Cherng ............... H01M 10/613
                                                    429/62
8,785,026 B2   7/2014 Hu et al.
(Continued)

FOREIGN PATENT DOCUMENTS

CN     101842933 A     9/2010
CN     102117945 A     7/2011
(Continued)

OTHER PUBLICATIONS

Taiwan Patent Office, "Office Action", dated Nov. 25, 2019, Taiwan.
(Continued)

*Primary Examiner* — Ula C Ruddock
*Assistant Examiner* — Matthew W Van Oudenaren
(74) *Attorney, Agent, or Firm* — Locke Lord LLP; Tim Tingkang Xia, Esq.

(57) ABSTRACT

A fireproof battery module including a plurality of battery cells and at least one fireproof layer. The battery cells are electrically connected to one another. The at least one fireproof layer is located between two of the plurality of battery cells that are adjacent to each other. The fireproof layer includes a heat absorbing part and a heat insulation part that are connected to each other. The heat absorbing part includes a vaporizable material and a thermal conductivity of the heat insulation part is lower than a thermal conductivity of the heat absorbing part.

25 Claims, 12 Drawing Sheets

(51) Int. Cl.
*H01M 10/6554* (2014.01)
*H01M 10/658* (2014.01)
*H01M 50/24* (2021.01)
*H01M 50/116* (2021.01)
*H01M 50/213* (2021.01)
*H01M 50/20* (2021.01)

(52) U.S. Cl.
CPC ...... *H01M 10/6554* (2015.04); *H01M 50/116* (2021.01); *H01M 50/20* (2021.01); *H01M 50/213* (2021.01); *H01M 50/24* (2021.01); *H01M 2200/10* (2013.01)

(56) References Cited

U.S. PATENT DOCUMENTS

| | | | |
|---|---|---|---|
| 2010/0136396 A1* | 6/2010 | Hermann | H01M 50/20 429/99 |
| 2010/0183910 A1* | 7/2010 | Nishino | H01M 2/1055 429/163 |
| 2011/0159340 A1* | 6/2011 | Hu | H01M 2/1077 429/120 |
| 2014/0017525 A1 | 1/2014 | Schaefer | |
| 2015/0118543 A1 | 4/2015 | Kim et al. | |
| 2018/0069211 A1* | 3/2018 | Mastrandrea | B60L 50/64 |
| 2018/0069212 A1* | 3/2018 | Mastrandrea | H01M 10/052 |
| 2018/0205048 A1* | 7/2018 | Enomoto | H01M 2/105 |
| 2020/0287252 A1* | 9/2020 | Li | H01M 10/625 |

FOREIGN PATENT DOCUMENTS

| | | | |
|---|---|---|---|
| CN | 202557965 U | | 11/2012 |
| CN | 203150640 U | | 8/2013 |
| CN | 103579697 A | | 2/2014 |
| CN | 203800094 U | | 8/2014 |
| CN | 104466053 A | | 3/2015 |
| CN | 204287235 U | | 4/2015 |
| CN | 204375798 U | | 6/2015 |
| CN | 105244550 A | | 1/2016 |
| CN | 104096331 B | | 8/2016 |
| CN | 106329027 A | | 1/2017 |
| CN | 108054460 A | | 5/2018 |
| CN | 108232064 A | | 6/2018 |
| CN | 108400408 A | | 8/2018 |
| CN | 109037844 A | | 12/2018 |
| KR | 20070106815 A | | 11/2007 |
| KR | 20080066312 A | | 7/2008 |
| KR | 20150092572 A | | 8/2015 |
| TW | 200640053 | | 11/2006 |
| TW | I419391 B | | 12/2013 |
| TW | M505063 U | | 7/2015 |
| TW | 201529722 A | | 8/2015 |
| TW | M558473 U | | 4/2018 |
| WO | WO2018099396 | * | 6/2018 |

OTHER PUBLICATIONS

Michael Mo, KULR Technology Thermal Management Solution For Lithium-ion Battery Pack, Battery Safety, 2017.

* cited by examiner

FIREPROOF BATTERY MODULE AND FIREPROOF LAYER

CROSS-REFERENCE TO RELATED APPLICATIONS

This non-provisional application claims priority under 35 U.S.C. § 119(a) on Patent Application No(s). 108100329 filed in Taiwan, R.O.C. on Jan. 4, 2019, the entire contents of which are hereby incorporated by reference.

TECHNICAL FIELD

The disclosure relates to a battery module and an insulation layer, more particularly to a fireproof battery module and a fireproof layer thereof.

BACKGROUND

In some instances, an internal short circuit or other defects may cause a thermal runway in battery cell, leading to excessive overheating or fire. Especially for the lithium battery modules consisting of a very tight arrangement of lithium battery cells, the thermal runaway in one battery cell may easily cause thermal runaways in neighboring or all the other battery cells, causing fire and explosion of the battery module. Therefore, it is a must to develop materials or methods that can avoid the above accidents.

SUMMARY

One embodiment of this disclosure provides a fireproof battery module including a plurality of battery cells and at least one fireproof layer. The plurality of battery cells are electrically connected to one another. The at least one fireproof layer is located between two of the plurality of battery cells that are adjacent to each other. The at least one fireproof layer includes a heat absorbing part and a heat insulation part that are connected to each other. The heat absorbing part includes a vaporizable material and a thermal conductivity of the heat insulation part is lower than a thermal conductivity of the heat absorbing part.

Another embodiment of this disclosure provides a fireproof layer including a heat absorbing part and a heat insulation part. The heat absorbing part includes a vaporizable material and a thermal conductivity of the heat insulation part is lower than a thermal conductivity of the heat absorbing part.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
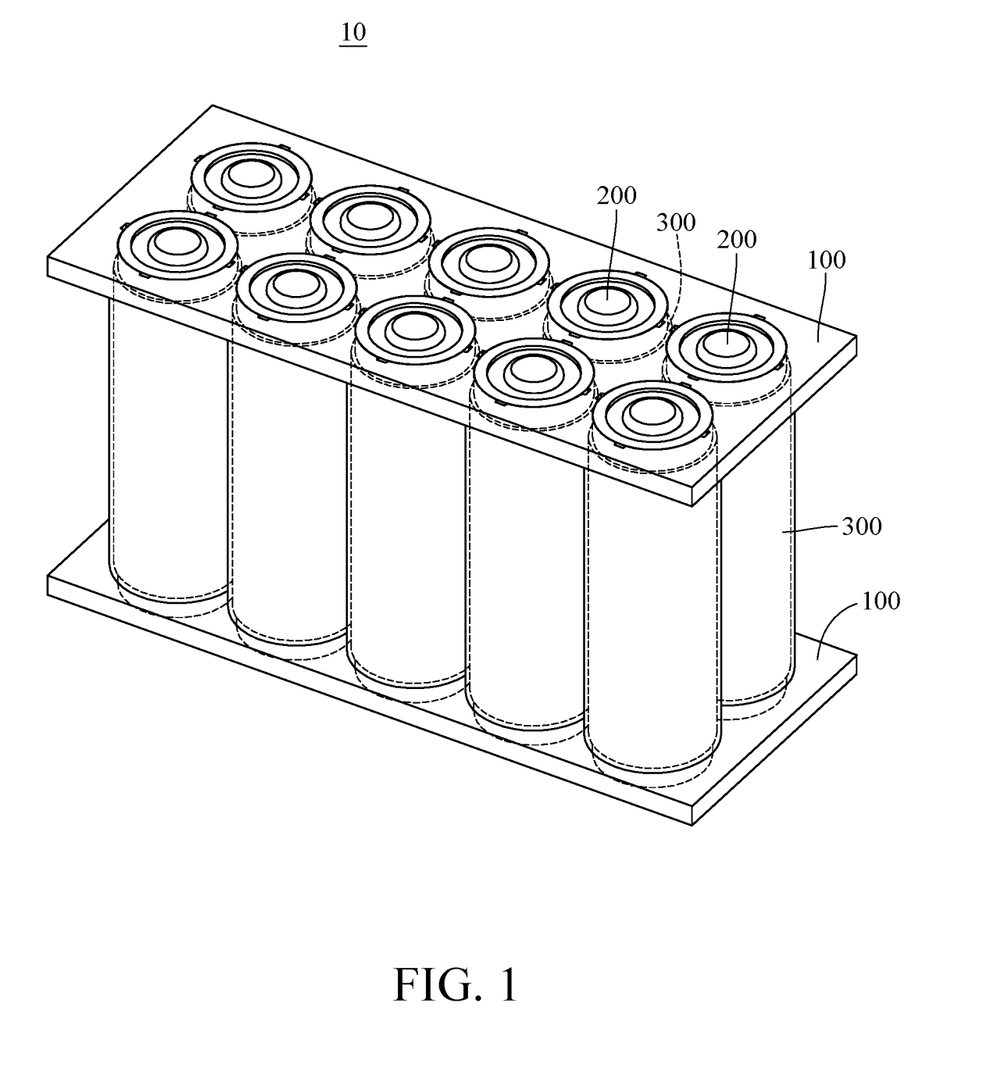
FIG. 1 is a perspective view of a fireproof battery module according to a first embodiment of the disclosure.
Figure 2:
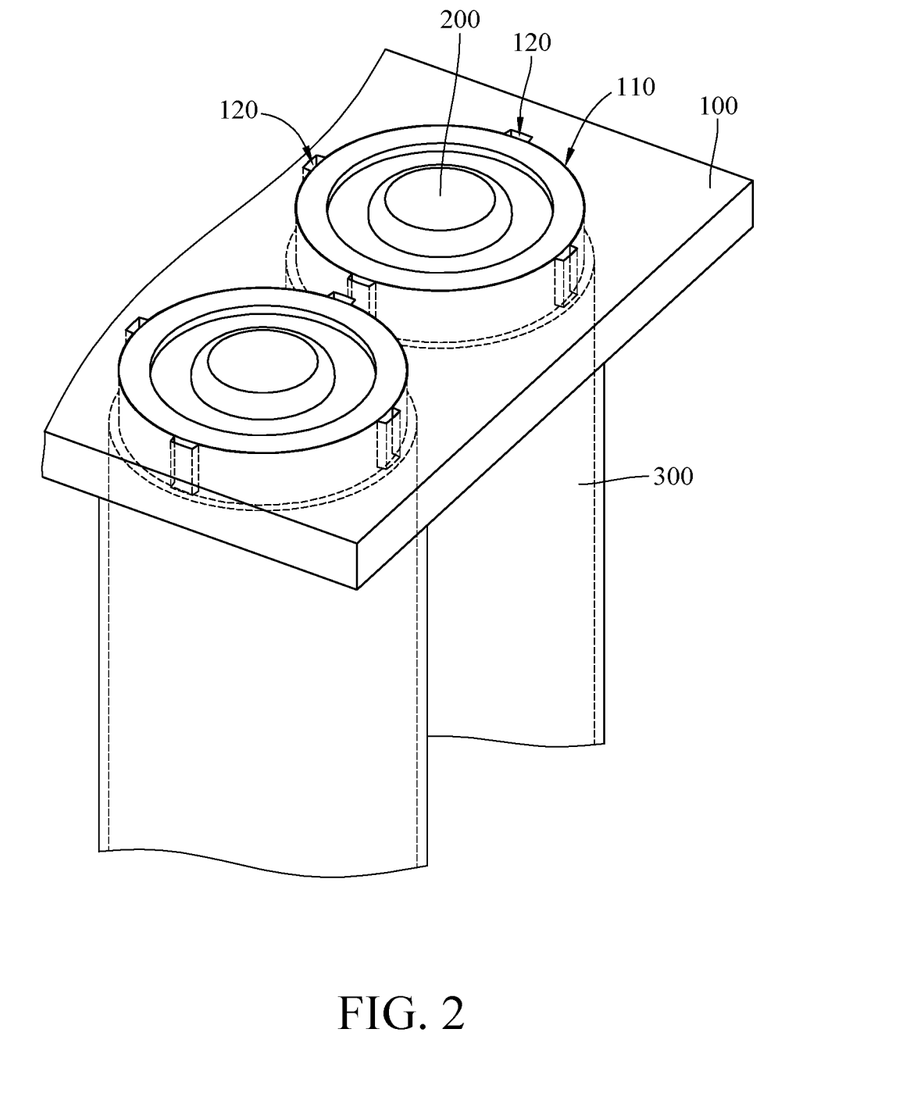
FIG. 2 is a partially enlarged view of FIG. 1.
Figure 3:
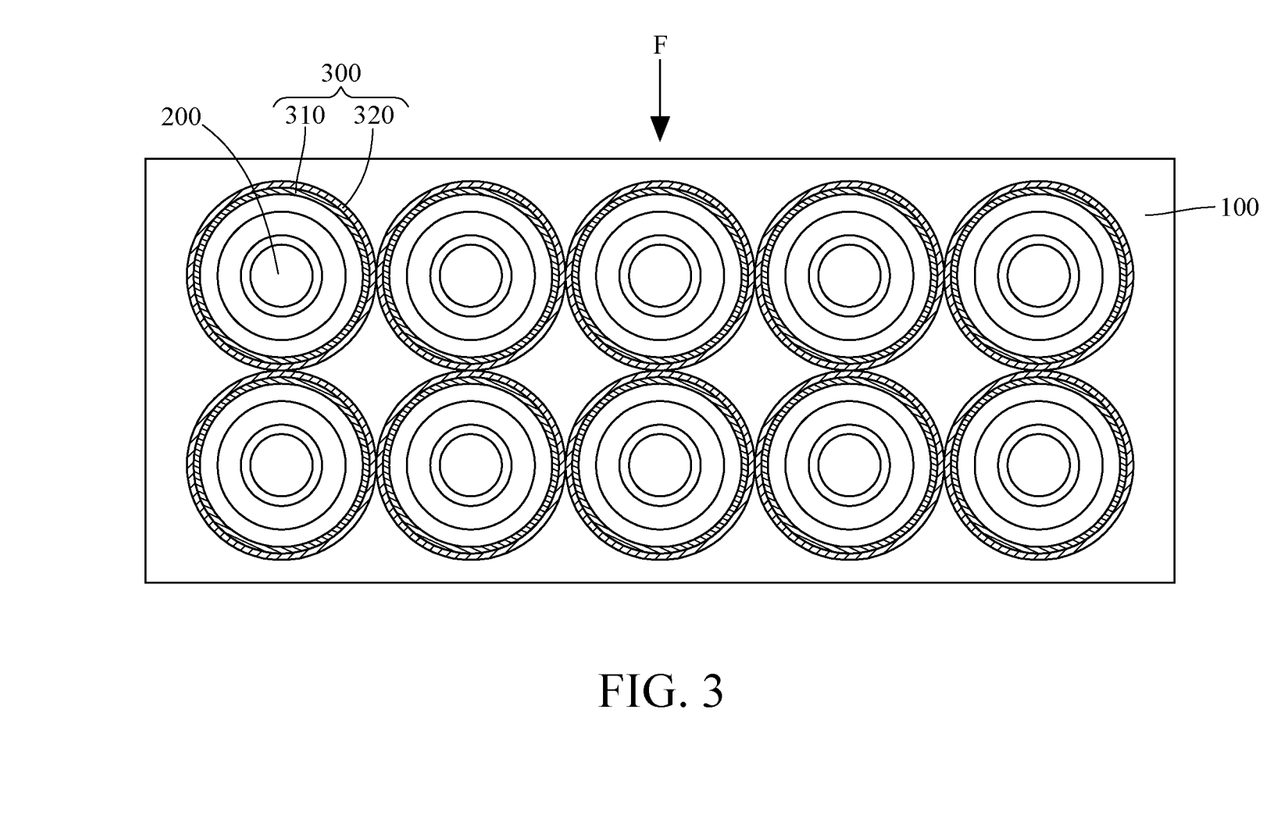
FIG. 3 is a top view of the fireproof battery module in FIG. 1 when one of holders is removed.

Please refer to FIG. 1 to FIG. 3. FIG. 1 is a perspective view of a fireproof battery module according to a first embodiment of the disclosure. FIG. 2 is a partially enlarged view of FIG. 1. FIG. 3 is a top view of the fireproof battery module in FIG. 1 when one of holders is removed.

This embodiment provides a fireproof battery module 10 including two holders 100, a plurality of battery cells 200, and a plurality of fireproof layers 300. In the following paragraphs, the fireproof battery module 10 may be simply called battery module or module. The two holders 100 each have a plurality of battery holding holes 110. The battery holding holes 110 are arranged in lines, but the disclosure is not limited thereto; in other embodiments, the battery holding holes on each holder may be arranged in a honeycomb-like arrangement.

In this embodiment, each battery holding hole 110 is connected with four vent holes 120. In more detail, the vent holes 120 are respectively located on different sides of the respective battery holding hole 110. The function of the vent holes 120 will be explained later. Note that the disclosure is not limited by the quantity of the vent holes 120 connected with the battery holding hole 110; in other embodiments, each battery holding hole may only have one vent hole or no vent hole.

Two opposite ends of each battery cell 200 are respectively disposed in the battery holding holes 110 of the holders 100. The battery cells 200 are electrically connected to one another in series or parallel.

The fireproof layers 300 respectively surround the battery cells 200 and each fireproof layer 300 is a double-layer structure. The fireproof layers 300 are able to prevent heat caused by the thermal runaway in one of the battery cells 200 from spreading to the neighboring battery cells 200 so that the fireproof layers 300 may be considered as spacers between the battery cells 200.

In detail, please refer to FIG. 3, each fireproof layer 300 includes a heat absorbing part 310 and a heat insulation part 320. In more detail, the heat absorbing part 310 is surrounded by the heat insulation part 320. In this embodiment, each heat absorbing part 310 includes phase change material. In this embodiment, the phase change material contains vaporizable materials that can sublimate, evaporate or boil. In the former case, as the heat absorbing part 310 absorbs a certain amount of heat, it can directly change from solid or nearly solid phase (e.g. colloid) to gas phase, without becoming liquid in between; in the latter case, as the heat absorbing part 310 absorbs a certain amount of heat, it can evaporate from liquid phase to gas phase. Each heat absorbing part 310 includes, for example, a material selected from a group consisting of porous material, absorbents (e.g., sodium polyacrylate), and a specific material having high heat capacity. The said specific material may be water, Trimethyl Phosphate (TMP) or Tetrabromobisphenol A (TBBPA). In addition, the vent holes 120 of the holders 100 are connected to a space in which the heat absorbing part 310 is located so that the vaporized heat absorbing part 310 can be exhausted from the vent holes 120. This will be explained later.

Furthermore, in this or other embodiments, each heat absorbing part 310 may be produced by encapsulating a tackifier, a water-retaining agent (e.g., sodium polyacrylate) and a heat absorbing material (e.g., water) in an aluminum foil bag.

In addition, the weight of the heat absorbing part 310 may be modified based on the possible amount of heat generated by the thermal runaway in the respective battery cell 200. For example, a penetration test is performed to cause the thermal runaway in the battery cell 200. The temperature of the battery cell 200 increases from the room temperature to approximately 700° C. within 13 seconds, and the convection occurring within the very first 13 seconds may not be taken into consideration since such convection is rapid. Then, the convection after the first 13 seconds may decrease the temperature of the battery cell 200 down to approximately 600° C. Therefore, the weight of the heat absorbing part 310 will be determined based on the temperature of the battery cell 200 after 13 seconds. If the thermal runaway can be prevented as the temperature of the battery cell 200 is approximately 400° C., meaning that temperature of the battery cell 200 is required to be further decreased by approximately 200° C., the battery cell 200 would require about 1.6 grams of the heat absorbing part 310.

In addition, as shown in the figures, in this embodiment, the heat absorbing part 310 is a ring-shaped structure that surrounds the battery cell 200, but the disclosure is not limited thereto; in other embodiments, the heat absorbing part may be a half-ring-shaped structure that only covers part of the battery cell 200.

Further, the thermal conductivity of the heat insulation part 320 is lower than that of the heat absorbing part 310. In this embodiment, the heat insulation part 320 includes a composite material that may include a thermoplastic or thermoset substrate additionally containing a material selected from a group consisting of $AlOH_3$, $Mg(OH)_2$, $NO_x$, $KAl(SO_4)_2 \cdot 12H_2O$, but the disclosure is not limited thereto; in other embodiments, the heat insulation part 320 may also include a material selected from a group consisting of asbestos, resin bonded fiberglass plate, or plastic plate. The plastic plate may include PE, EVA, PP, ABS, Epoxy and PVC. Alternatively, the heat insulation part 320 may also include a polymeric material whose melting point is approximately between 40° C. and 80° C. The said polymeric material may be wax with low melting point.

Furthermore, to each set of the fireproof layer 300 and the battery cell 200, the battery cell 200 is surrounded by the heat absorbing part 310, and the heat absorbing part 310 is surrounded by the heat insulation part 320; that is, the heat absorbing part 310 is located closer to the battery cell 200 than the heat insulation part 320.

Figure 4:
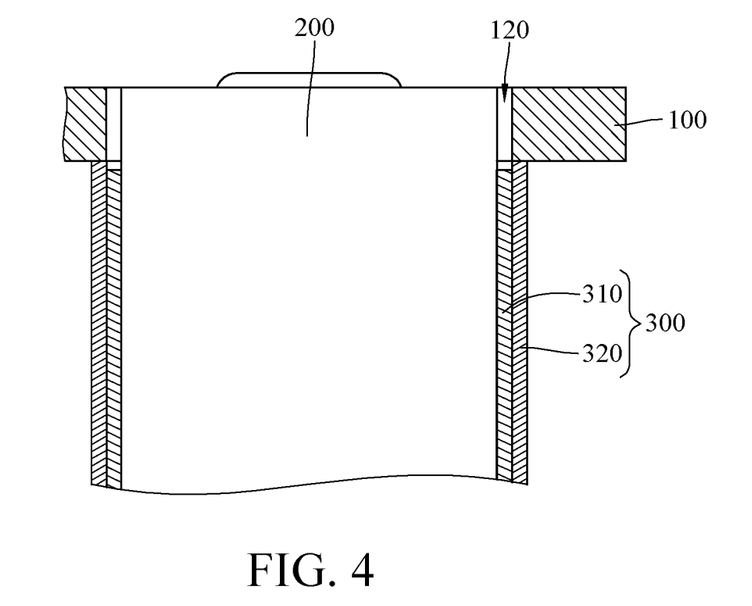
FIG. 4 is a partially enlarged cross-sectional view of FIG. 2.
Figure 5:
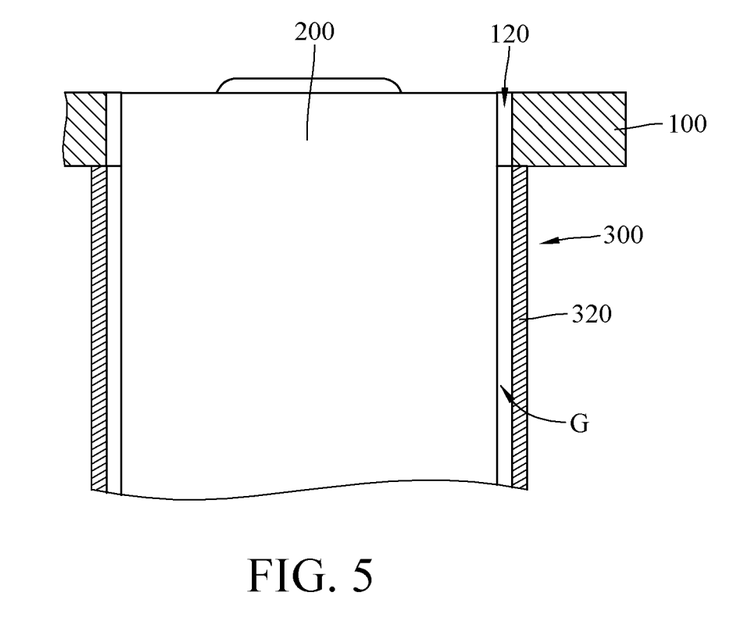
FIG. 5 is a partially enlarged cross-sectional view of FIG. 4 after a heat absorbing part has been vaporized.

Then, please refer to FIG. 3 and further refer to FIGS. 4 and 5. FIG. 4 is a partially enlarged cross-sectional view of FIG. 2. FIG. 5 is a partially enlarged cross-sectional view of FIG. 4 after a heat absorbing part has been vaporized.

As shown in FIG. 3, when the battery module 10 operates at a predetermined working temperature, the fireproof layers 300 would not affect the temperature of the fireproof battery module 10. However, when the thermal runaway occurs at one of the battery cells 200 (indicated by arrow F), the fireproof layer 300 of the battery cell 200 is able to insulate the heat caused by the thermal runaway from the neighboring battery cells 200 so as to prevent the thermal runaway from occurring at the neighboring battery cells 200. As a result, the fireproof layer 300 can effectively prevent the heat from spreading and prolongs the time for heat dissipation, thereby preventing fire or explosion of the battery module 10.

In detail, as shown in FIG. 4 and FIG. 5, the heat absorbing part 310 is able to absorb part of the heat caused by the thermal runaway so as to decrease the temperature of the battery cell 200 to a level that allows the heat insulation part 320 to insulate the heat from the other battery cells 200. In addition, the heat causes the heat absorbing part 310 to vaporize to gas phase and flow through the vent holes 120. During the transition of the heat absorbing part 310, there will be a gap G (as shown in FIG. 5) formed between the heat insulation part 320 and the battery cell 200, and the ambient air may also flow into the gap G. As such, a layer of air is formed between the heat insulation part 320 and the battery cells 200 and helps to insulate the heat caused by the thermal runaway. As a result, the heat is constrained by the layer of air and the heat insulation part 320.

In addition, in this embodiment, the thermal conductivity K of the heat insulation part 320 can vary with the temperature. For example, the thermal conductivity K will decrease as the temperature of the heat insulation part 320 increases. In detail, when the temperature of the heat insulation part 320 is lower than a first temperature, the thermal conductivity K would be higher than 1 W/m·K, such as ranging between 1 and 4 W/m·K; when the temperature of the heat insulation part 320 is between the first temperature and a second temperature, the physical characteristics of the heat insulation part 320 will be changed due to the temperature variation; and when the temperature of the heat insulation part 320 is higher than the second temperature, the thermal conductivity K would be lower than 1 W/m·K, such as ranging between 0.001 and 0.5 W/m·K. The first temperature is lower than the second temperature. For example, the first temperature may be approximately 60° C., and the second temperature may be approximately 150° C. That is to say, when the temperature of the heat insulation part 320 is lower than 60° C., the thermal conductivity K would be higher than 1 W/m·K so that the heat insulation part 320 can conduct the heat efficiently; when the temperature of the heat insulation part 320 is between 60° C. and 150° C., the thermal conductivity K would decrease; and when the temperature of the heat insulation part 320 is higher than 150° C., the thermal conductivity K would be lower than 1 W/m·K so that the heat insulation characteristic of the heat insulation part 320 is improved at this moment.

In addition, the holders 100 may be optional and the battery cells 200 may be held by other means. In other embodiments, the battery cells 200 may be held in positions by a top and bottom electrode plates.

Further, the disclosure is not limited by the configuration of the fireproof layer 300. In other embodiments, the heat absorbing part and the heat insulation part in each fireproof layer may be combined into a single layer by mixing, fusing, bonding or chemical crosslinking process and each fireproof layer may contain non-homogeneous or homogeneous material.

Figure 6:
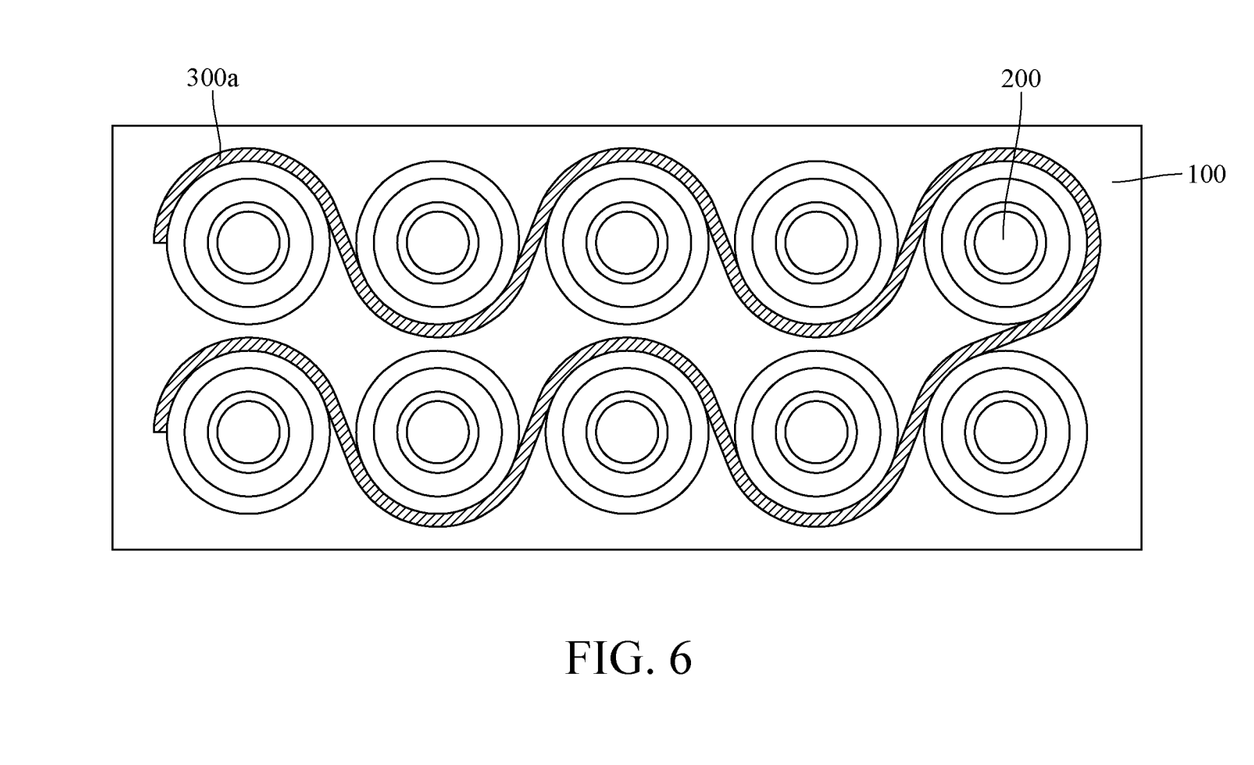
FIG. 6 is a top view of a fireproof battery module according to a second embodiment of the disclosure when one of holders is removed.

Note that the quantity of the fireproof layers 300 is not restricted. For example, please refer to FIG. 6, showing a top view of a fireproof battery module according to a second embodiment of the disclosure when one of holders is removed. In this embodiment, the same reference numbers denote the same components mentioned in the previous embodiment.

In this embodiment, a single fireproof layer 300a at least surrounds every battery cells 200. As shown in the figure, the fireproof layer 300a may be in a serpentine shape.

Figure 7:
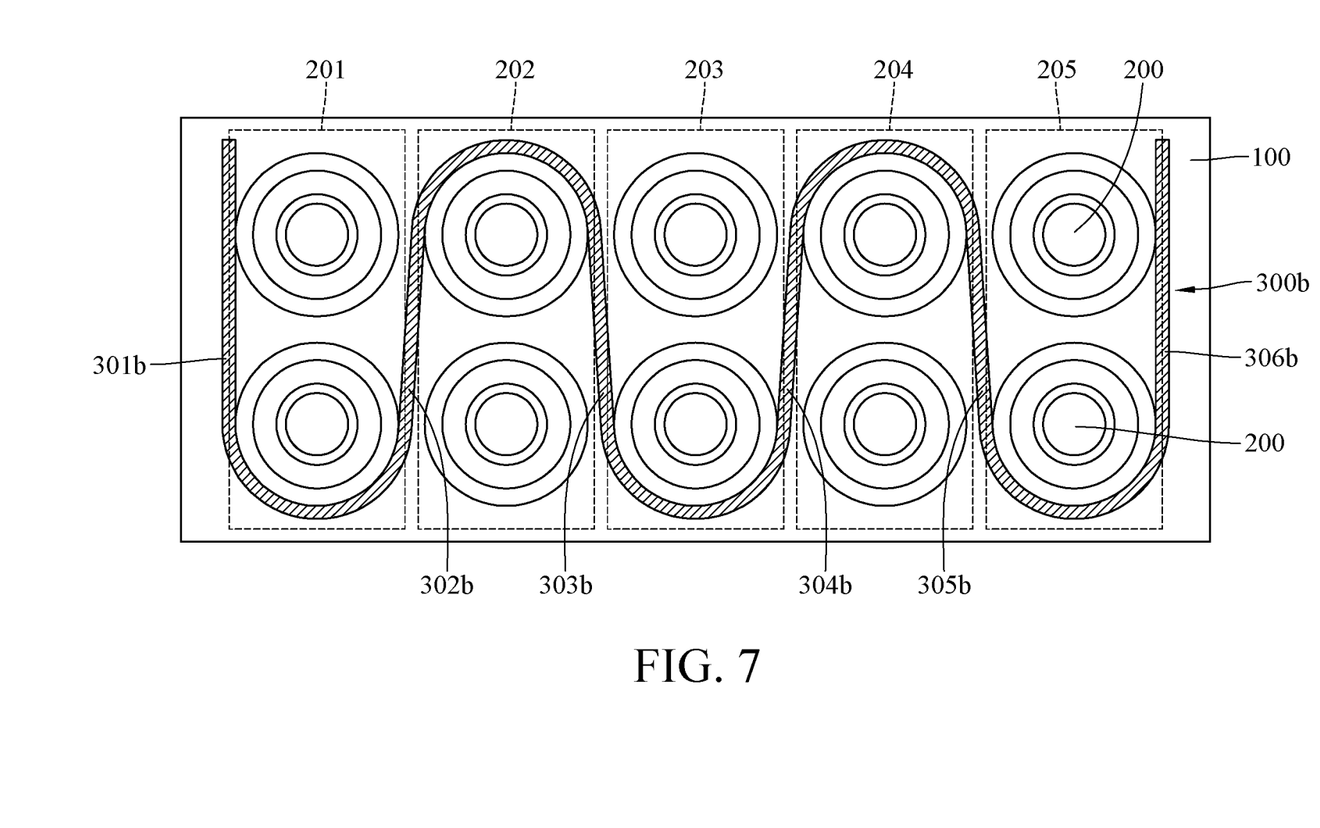
FIG. 7 is a top view of a fireproof battery module according to a third embodiment of the disclosure when one of holders is removed.

Please refer to FIG. 7, showing a top view of a fireproof battery module according to a third embodiment of the disclosure when one of holders is removed. In this embodiment, the same reference numbers denote the same components mentioned in the previous embodiment.

In this embodiment, the battery cells 200 are divided into a first battery cell group 201, a second battery cell group 202, a third battery cell group 203, a fourth battery cell group 204, and a fifth battery cell group 205. The battery cell groups 201 to 205 are arranged side by side. The fireproof layer 300b surrounds the battery cell groups 201 to 205. In detail, the fireproof layer 300b has a first part 301b, a second part 302b, a third part 303b, a fourth part 304b, a fifth part 305b, and a sixth part 306b. The first part 301b is located on a side of the first battery cell group 201 away from the second battery cell group 202. The second part 302b is located between the first battery cell group 201 and the second battery cell group 202. The third part 303b is located between the second battery cell group 202 and the third battery cell group 203. The fourth part 304b is located between the third battery cell group 203 and the fourth battery cell group 204. The fifth part 305b is located between the fourth battery cell group 204 and the fifth battery cell group 205. The sixth part 306b is located on a side of the fifth battery cell group 205 away from the fourth battery cell group 204.

Figure 8:
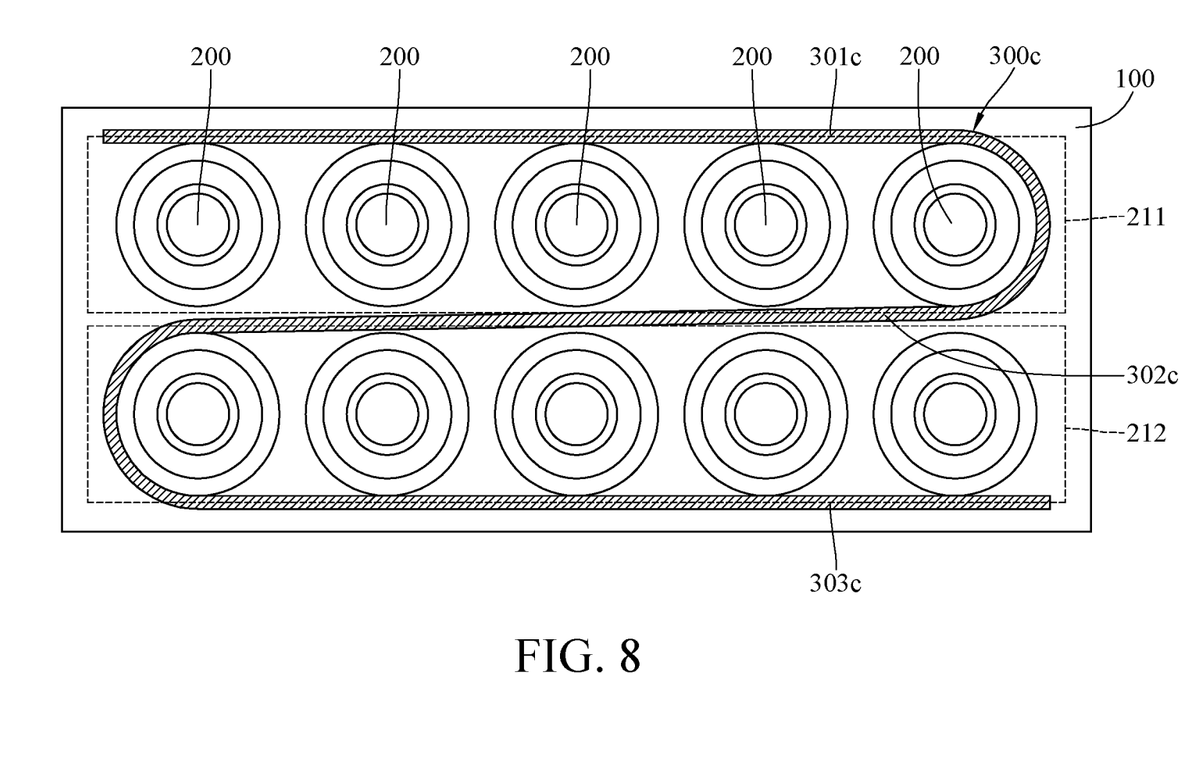
FIG. 8 is a top view of a fireproof battery module according to a fourth embodiment of the disclosure when one of holders is removed.

Please refer to FIG. 8, showing a top view of a fireproof battery module according to a fourth embodiment of the disclosure when one of holders is removed. In this embodiment, the same reference numbers denote the same components mentioned in the previous embodiment.

In this embodiment, the battery cells 200 are divided into a first battery cell group 211 and a second battery cell group 212. The first battery cell group 211 and the second battery cell group 212 are arranged side by side. The fireproof layer 300c surrounds the battery cell groups 211 and 212. In detail, the fireproof layer 300c has a first part 301c, a second part 302c and a third part 303c. The first part 301c is located on a side of the first battery cell group 211 away from the second battery cell group 212. The second part 302c is located between the first battery cell group 211 and the second battery cell group 212. The third part 303c is located on a side of the second battery cell group 212 away from the first battery cell group 211.

Figure 9:
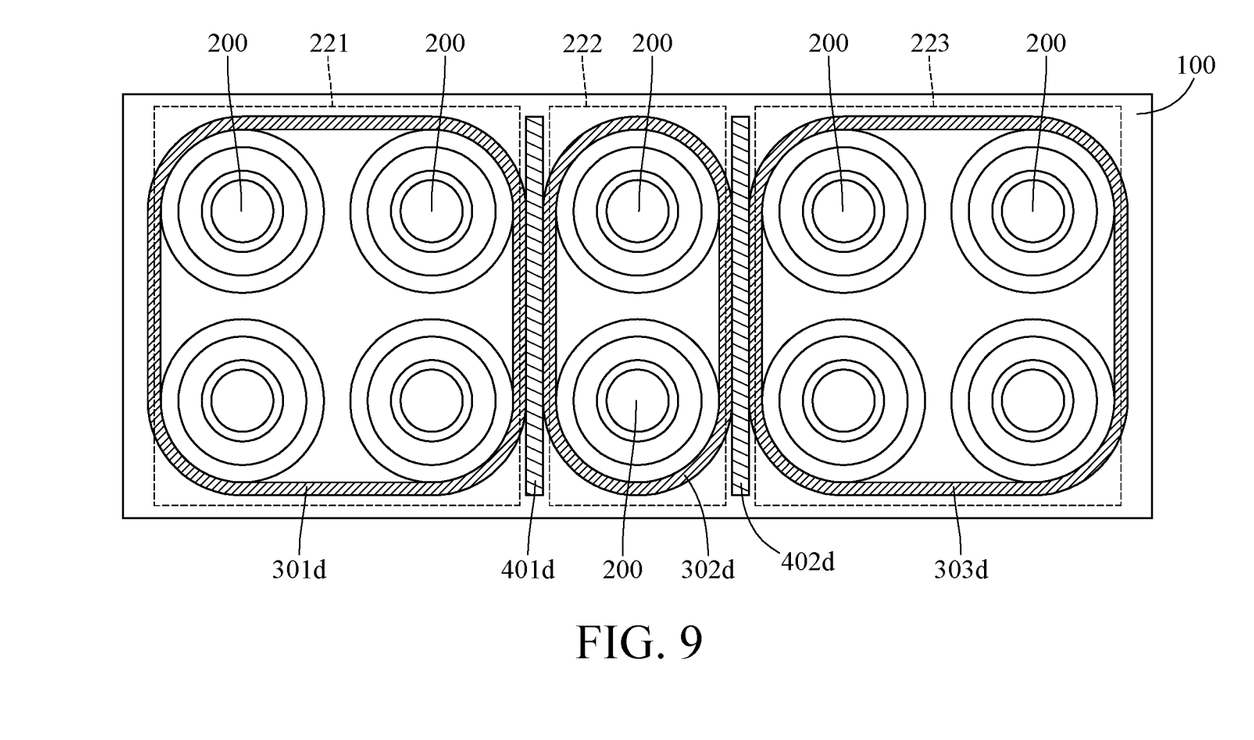
FIG. 9 is a top view of a fireproof battery module according to a fifth embodiment of the disclosure when one of holders is removed.

Please refer to FIG. 9, showing a top view of a fireproof battery module according to a fifth embodiment of the disclosure when one of holders is removed. In this embodiment, the same reference numbers denote the same components mentioned in the previous embodiment.

In, this embodiment, the battery cells 200 are divided into a first battery cell group 221, a second battery cell group 222 and a third battery cell group 223. The second battery cell group 222 is located between the first battery cell group 221 and the third battery cell group 223. This embodiment provides fireproof layers 301d, 302d and 303d that respectively surrounding the battery cell groups 221 to 223.

In addition, this embodiment further provides two first fireproof plates 401d and 402d. The first fireproof plate 401d is located between the first battery cell group 221 and the second battery cell group 222. The first fireproof plate 402d is located between the second battery cell group 222 and the third battery cell group 223. In this way, the thermal propagation in the battery module can be effectively avoided.

Figure 10:
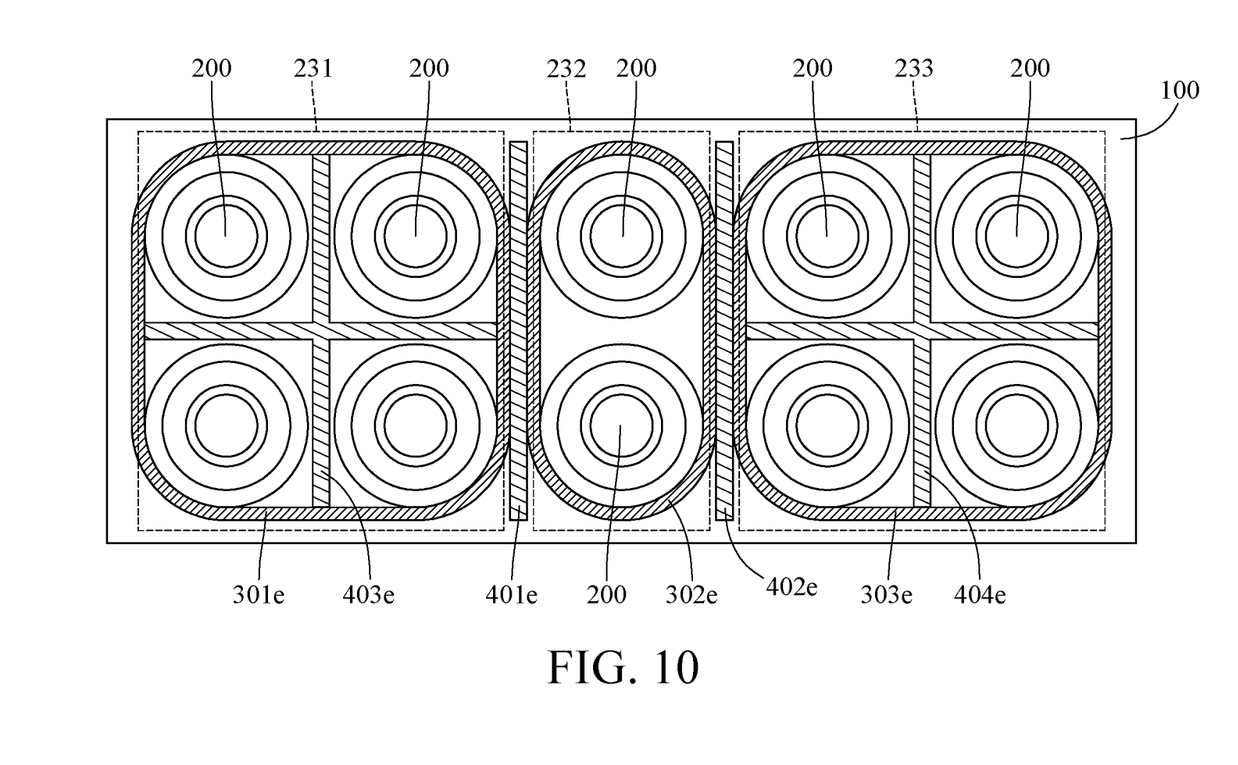
FIG. 10 is a top view of a fireproof battery module according to a sixth embodiment of the disclosure when one of holders is removed.

Please refer to FIG. 10, showing a top view of a fireproof battery module according to a sixth embodiment of the disclosure when one of holders is removed. In this embodiment, the same reference numbers denote the same components mentioned in the previous embodiment.

In this embodiment, the battery cells 200 are divided into a first battery cell group 231, a second battery cell group 232 and a third battery cell group 233. The second battery cell group 232 is located between the first battery cell group 231 and the third battery cell group 233. This embodiment provides fireproof layers 301e, 302e and 303 that respectively surrounding the battery cell groups 221 to 223.

In addition, this embodiment further provides two first fireproof plates 401e and 402e and two second fireproof plates 403e and 404e. The first fireproof plate 401e is located between the first battery cell group 231 and the second battery cell group 232. The first fireproof plate 402e is located between the second battery cell group 232 and the third battery cell group 233. The second fireproof plate 403e is a cross-shaped plate and insulates the battery cells 200 of the first battery cell group 231 from one another. The second fireproof plate 404e is a cross-shaped plate and insulates the battery cells 200 of the third battery cell group 233 from one another.

Figure 11:
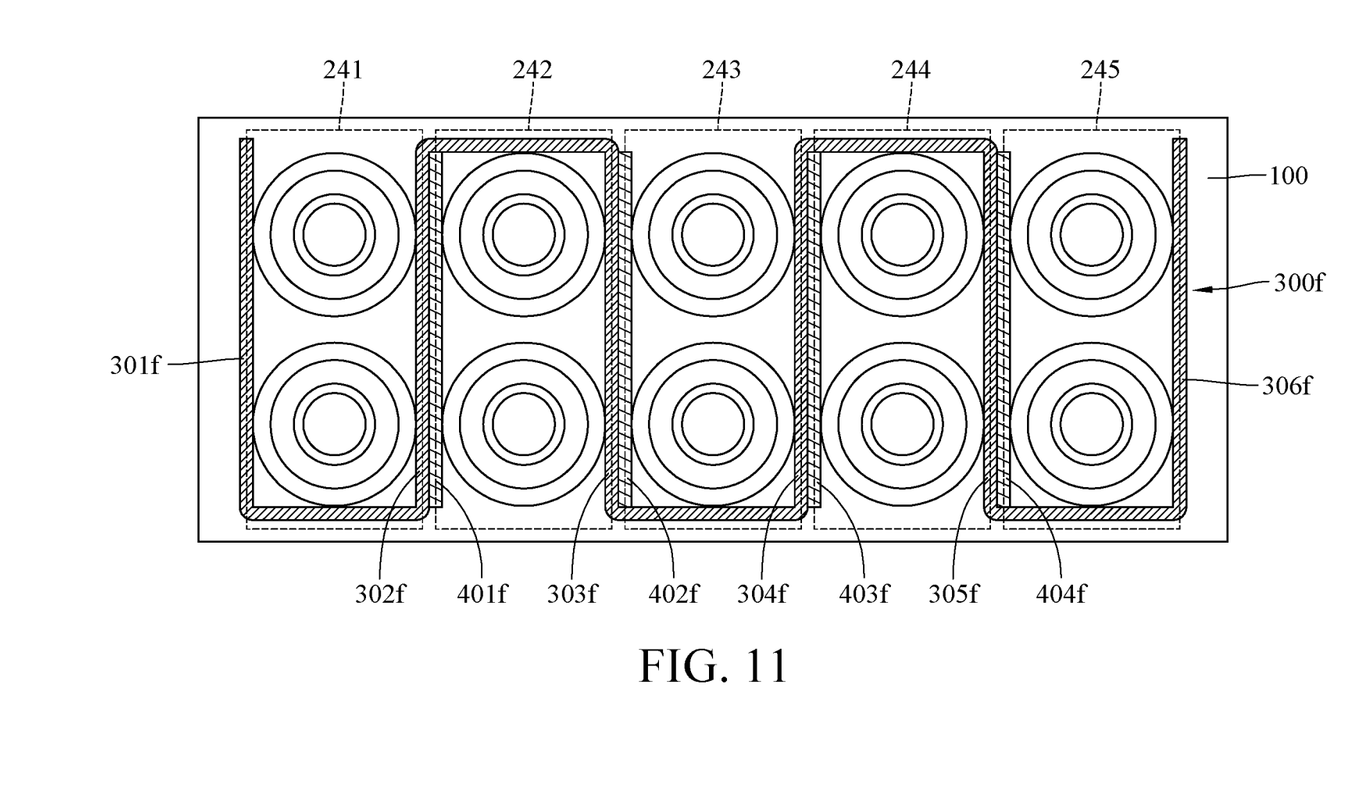
FIG. 11 is a top view of a fireproof battery module according to a seventh embodiment of the disclosure when one of holders is removed.

Please refer to FIG. 11, showing a top view of a fireproof battery module according to a seventh embodiment of the disclosure when one of holders is removed. In this embodiment, the same reference numbers denote the same components mentioned in the previous embodiment.

In this embodiment, the battery cells 200 are divided into a first battery cell group 241, a second battery cell group 242, a third battery cell group 243, a fourth battery cell group 244 and a fifth battery cell group 245. The battery cell groups 241 to 245 are arranged side by side. The fireproof layer 300f surrounds every battery cell groups 241 to 245. In detail, the fireproof layer 300f has a first part 301f, a second part 302f, a third part 303f, a fourth part 304f, a fifth part 305f and a sixth part 306f. The first part 301f is located on a side of the first battery cell group 241 away from the second battery cell group 242. The second part 302f is located between the first battery cell group 241 and the second battery cell group 242. The third part 303f is located between the second battery cell group 242 and the third battery cell group 243. The fourth part 304*f* is located between the third battery cell group 243 and the fourth battery cell group 244. The fifth part 305*f* is located between the fourth battery cell group 244 and the fifth battery cell group 245. The sixth part 306*f* is located on a side of the fifth battery cell group 245 away from the fourth battery cell group 244.

Additionally, this embodiment further provides fireproof plates 401*f* to 404*f* These fireproof plates 401*f* to 404*f* are respectively located between the battery cell groups 241 to 245.

The disclosure is not limited by the quantity of the fireproof plates 401*f* to 404*f* In other embodiments, there may only be one fireproof plate and the fireproof plate is located between two of the battery cell groups that are adjacent.

Figure 12:
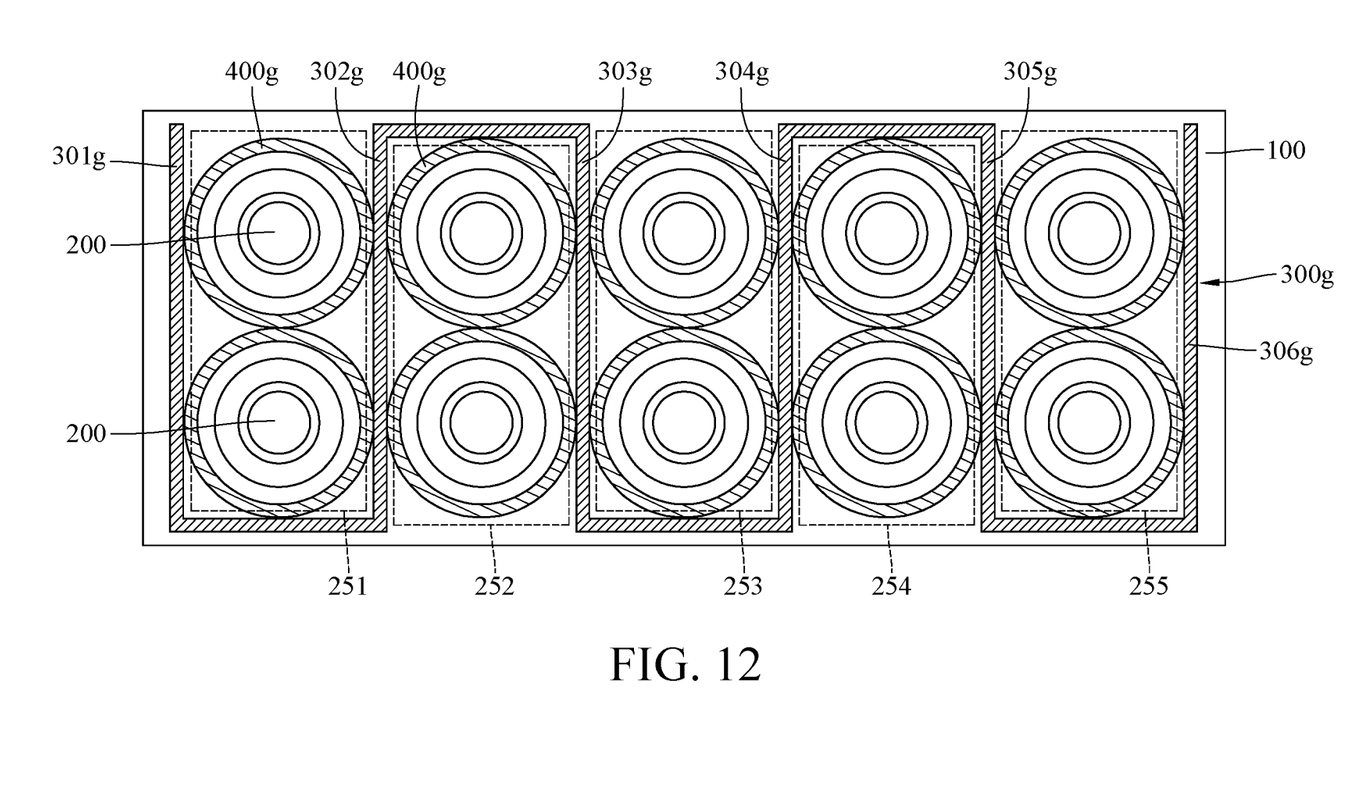
FIG. 12 is a top view of a fireproof battery module according to an eighth embodiment of the disclosure when one of holders is removed.

Please refer to FIG. 12, showing a top view of a fireproof battery module according to an eighth embodiment of the disclosure when one of holders is removed. In this embodiment, the same reference numbers denote the same components mentioned in the previous embodiment.

In this embodiment, the battery cells 200 are divided into a first battery cell group 251, a second battery cell group 252, a third battery cell group 253, a fourth battery cell group 254 and a fifth battery cell group 255. The battery cell groups 251 to 255 are arranged side by side. The fireproof layer 300*g* surrounds every battery cell groups 251 to 255. In detail, the fireproof layer 300*g* has a first part 301*g*, a second part 302*g*, a third part 303*g*, a fourth part 304*g*, a fifth part 305*g* and a sixth part 306*g*. The first part 301*g* is located on a side of the first battery cell group 251 away from the second battery cell group 252. The second part 302*g* is located between the first battery cell group 251 and the second battery cell group 252. The third part 303*g* is located between the second battery cell group 252 and the third battery cell group 253. The fourth part 304*g* is located between the third battery cell group 253 and the fourth battery cell group 254. The fifth part 305*g* is located between the fourth battery cell group 254 and the fifth battery cell group 255. The sixth part 306*g* is located on a side of the fifth battery cell group 255 away from the fourth battery cell group 254.

Furthermore, this embodiment further provides a plurality of fireproof plates 400*g*. These fireproof plates 400*g* respectively surround the battery cells 200.

Figure 13:
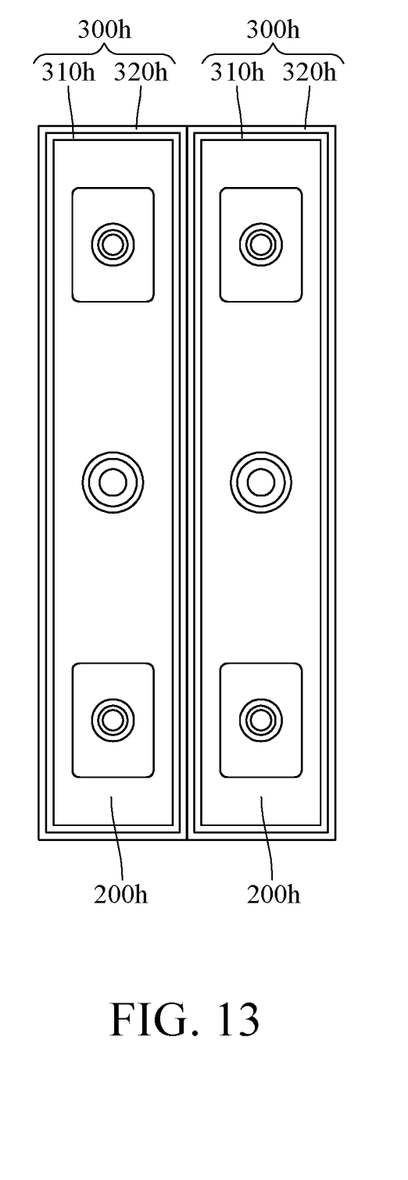
FIG. 13 is a top view of a fireproof battery module according to a ninth embodiment of the disclosure when one of holders is removed.

The battery cell 200 is not limited to be in a circular shape. Please refer to FIG. 13, showing a top view of a fireproof battery module according to a ninth embodiment of the disclosure when one of holders is removed.

In this embodiment, the battery cell 200*h* is in a square shape and the fireproof layers 300*h* respectively surrounds the battery cells 200*h*. Each fireproof layer 300*h* includes the heat absorbing part 310*h* and the heat insulation part 320*h* that are stacked to each other.

Figure 14:
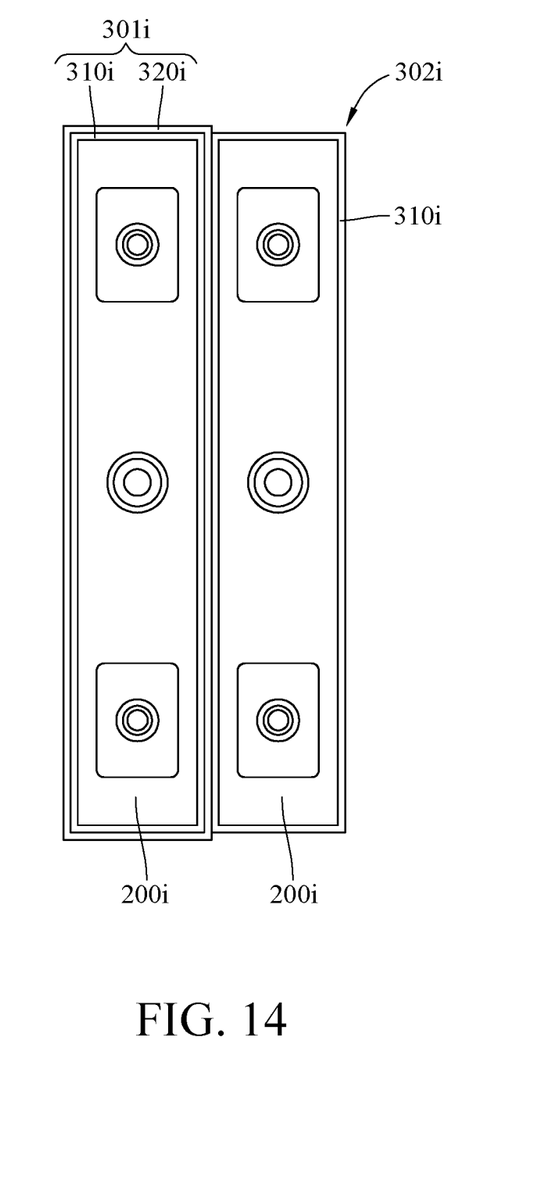
FIG. 14 is a top view of a fireproof battery module according to a tenth embodiment of the disclosure when one of fixing components is removed.

Please refer to FIG. 14. FIG. 14 is a top view of a fireproof battery module according to a tenth embodiment of the disclosure when one of holders is removed.

In this embodiment, the battery cell 200*i* is in a square shape and the fireproof layers 301*i* and 302*i* respectively surrounds the battery cells 200*i*. The fireproof layer 301*i* includes the heat absorbing part 310*i* and the heat insulation part 320*i* that are stacked to each other, but the fireproof layer 302*i* only includes the heat absorbing part 310*i*. That is, the two battery cells 200*i* shown in FIG. 14 share the same heat insulation part 320*i*.

According to the fireproof battery module discussed above, the heat absorbing part of the fireproof layer includes the vaporizable material so that the heat absorbing part is able to be vaporized by the heat generated by the battery cell and creates an air layer between the battery cell and the heat insulation part, thereby decreasing the temperature of the battery cell and preventing the heat from spreading to the other battery cells. Also, the thermal conductivity of the heat insulation part is lower than that of the heat absorbing part, such that the heat insulation part can further secure the thermal insulation of the heat. As such, the thermal runaway is prevented from resulting in thermal propagation in the battery module so that the safety issues of the battery module are improved.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A fireproof battery module, comprising:
   a plurality of battery cells, electrically connected to one another;
   at least one fireproof layer, located between two of the plurality of battery cells that are adjacent to each other, the at least one fireproof layer comprising a heat absorbing part and a heat insulation part that are connected to each other, wherein the heat absorbing part comprises a vaporizable material, and a thermal conductivity of the heat insulation part is lower than a thermal conductivity of the heat absorbing part; and
   at least one holder having a plurality of battery holding holes and a plurality of vent holes, wherein the plurality of battery cells are respectively partially disposed in the plurality of battery holding holes, the plurality of vent holes connect to and extend outward from the plurality of battery holding holes and are aligned with the heat absorbing part of the at least one fireproof layer.

2. The fireproof battery module according to claim 1, wherein the at least one fireproof layer comprises a plurality of fireproof layers, each of the fireproof layers consists of the heat insulation part and the heat absorbing part, the heat absorbing part of each of the fireproof layers is in a hollow cylindrical shape surrounding a corresponding one of the battery cells, and in each of the fireproof layers, the heat absorbing part is surrounded by the heat insulation part.

3. The fireproof battery module according to claim 1, wherein the heat absorbing part and the heat insulation part are combined into a single layer by mixing, fusing, bonding or chemical crosslinking process.

4. The fireproof battery module according to claim 1, wherein the at least one fireproof layer comprises a non-homogeneous material or a homogeneous material.

5. The fireproof battery module according to claim 1, wherein the thermal conductivity of the heat insulation part decreases as a temperature of the heat insulation part increases.

6. The fireproof battery module according to claim 5, wherein when the temperature of the heat insulation part is lower than a first temperature, the thermal conductivity of the heat insulation part is higher than 1 W/m·K; when the temperature of the heat insulation part is higher than a second temperature, the thermal conductivity of the heat insulation part is lower than 1 W/m·K, and the first temperature is lower than the second temperature.

7. The fireproof battery module according to claim 1, wherein the plurality of battery cells comprise a first battery cell group and a second battery cell group that are arranged side by side, and the at least one fireproof layer is located between the first battery cell group and the second battery cell group.

8. The fireproof battery module according to claim 7, wherein the at least one fireproof layer further comprises a first part, a second part and a third part, the first part is connected to the third part via the second part, the at least one fireproof layer surrounds the first battery cell group and the second battery cell group, the first battery cell group is located between the first part and the second part of the at least one fireproof layer, and the second battery cell group is located between the second part and the third part of the at least one fireproof layer so that all of the battery cells are separated from one another.

9. The fireproof battery module according to claim 8, further comprising a fireproof plate, the fireproof plate and the at least one fireproof layer comprise different materials, and the fireproof plate is located between the second part of the fireproof layer and the second battery cell group.

10. The fireproof battery module according to claim 1, further comprising a plurality of fireproof plates, the plurality of fireproof plates and the at least one fireproof layer comprise different materials, and each of the plurality of fireproof plates is in a cylindrical shape and the plurality of battery cells are respectively sleeved by the plurality of fireproof plates.

11. The fireproof battery module according to claim 1, wherein the at least one fireproof layer surrounds each of the plurality of battery cells so that the plurality of battery cells are spaced apart from one another by the at least one fireproof layer.

12. The fireproof battery module according to claim 1, wherein a quantity of the at least one fireproof layer is plural, and the fireproof layers each have a cylindrical shape, and the plurality of battery cells are respectively sleeved by the fireproof layers.

13. The fireproof battery module according to claim 1, wherein a quantity of the at least one fireproof layer is plural, the plurality of battery cells comprise a plurality of battery cell groups, and the fireproof layers respectively surround the plurality of battery cell groups.

14. The fireproof battery module according to claim 13, further comprising a first fireproof plate, the first fireproof plate and the plurality of fireproof layers comprise different materials, and the first fireproof plate is located between parts of the fireproof layers that are located between the plurality of battery cell groups.

15. The fireproof battery module according to claim 14, further comprising a second fireproof plate, the second fireproof plate and the plurality of fireproof layers comprise different materials, and the second fireproof plate is in a cross shape to space all of the battery cells of one of the plurality of battery cell groups apart from one another.

16. The fireproof battery module according to claim 1, wherein the heat insulation part comprises a composite material comprising a thermoset plastic substrate additionally comprising a material selected from a group consisting of $AlOH_3$, $Mg(OH)_2$, $NO_x$, and $KAl(SO_4)_2 \cdot 12H_2O$.

17. The fireproof battery module according to claim 1, wherein the heat insulation part comprises a material selected from a group consisting of Asbestos, resin bonded fiberglass plate or plastic plate, and a material of the plastic plate comprises polyethylene (PE), ethylene-vinyl acetate (EVA), polypropylene (PP), acrylonitrile butadiene styrene (ABS), and polyvinyl chloride (PVC).

18. The fireproof battery module according to claim 1, wherein the heat absorbing part comprises a material selected from a group consisting of porous material and absorbents.

19. The fireproof battery module according to claim 1, wherein the heat absorbing part comprises sodium polyacrylate, water, Trimethyl Phosphate (TMP), or Tetrabromobisphenol A (TBBPA).

20. A fireproof layer, configured to be disposed on a battery cell, comprising:
a heat absorbing part, comprising a vaporizable material; and
a heat insulation part, connected to the heat absorbing part, a thermal conductivity of the heat insulation part is lower than a thermal conductivity of the heat absorbing part;
wherein the heat absorbing part comprises a material selected from a group consisting of porous material and absorbents, the heat absorbing part is in a hollow cylindrical shape surrounded by the heat insulation part, and the heat absorbing part is configured to surround the battery cell.

21. The fireproof layer according to claim 20, wherein the heat absorbing part and the heat insulation part are combined into a single layer by mixing, fusing, bonding or chemical crosslinking process.

22. The fireproof layer according to claim 20, wherein the fireproof layer comprises a non-homogeneous material or a homogeneous material.

23. The fireproof layer according to claim 20, wherein the thermal conductivity of the heat insulation part decreases as a temperature of the heat insulation part increases.

24. The fireproof layer according to claim 23, wherein when the temperature of the heat insulation part is lower than a first temperature, the thermal conductivity of the heat insulation part is higher than 1 W/m·K; when the temperature of the heat insulation part is higher than a second temperature, the thermal conductivity of the heat insulation part is lower than 1 W/m·K, and the first temperature is lower than the second temperature.

25. The fireproof battery module according to claim 1, wherein the heat insulation part comprises a composite material comprising a thermoplastic substrate additionally comprising a material selected from a group consisting of $AlOH_3$, $Mg(OH)_2$, $NO_x$, and $KAl(SO_4)_2 \cdot 12H_2O$.

* * * * *